United States Patent
Narad

(10) Patent No.: US 7,464,212 B2
(45) Date of Patent: Dec. 9, 2008

(54) METHOD AND APPARATUS FOR DETERMINING COMPATIBILITY BETWEEN DEVICES

(75) Inventor: Charles Narad, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 11/006,052

(22) Filed: Dec. 6, 2004

(65) Prior Publication Data

US 2006/0123165 A1 Jun. 8, 2006

(51) Int. Cl.
*G06F 13/00* (2006.01)

(52) U.S. Cl. .......................................... 710/300; 710/62

(58) Field of Classification Search ......... 710/300–304, 710/104, 8, 62
See application file for complete search history.

(56) References Cited

U.S. PATENT DOCUMENTS

| | | | | |
|---|---|---|---|---|
| 5,450,570 A | * | 9/1995 | Richek et al. | 710/10 |
| 5,768,632 A | * | 6/1998 | Husted et al. | 710/72 |
| 5,822,614 A | * | 10/1998 | Kenton et al. | 710/8 |
| 6,044,423 A | * | 3/2000 | Seo et al. | 710/302 |
| 6,209,043 B1 | * | 3/2001 | Sanemitsu | 710/5 |
| 6,266,720 B1 | * | 7/2001 | Kakinoki | 710/63 |
| 6,917,523 B2 | * | 7/2005 | Summers et al. | 361/719 |
| 6,973,519 B1 | * | 12/2005 | Estakhri et al. | 710/104 |
| 7,035,945 B2 | * | 4/2006 | Boyfield et al. | 710/10 |
| 2005/0197017 A1 | * | 9/2005 | Chou et al. | 439/660 |
| 2007/0101036 A1 | * | 5/2007 | Son et al. | 710/301 |

OTHER PUBLICATIONS

PCI Express Base Specification, Revision 1.0a, Apr. 15, 2003, pp. 333-364.*
AdvancedTCA PICMG 3.0 Short Form Specification, Jan. 2003, pp. 1, 4, 10 and 12.*
Computer Dictionary, Microsoft Press, 3rd Edition, p. 58, Copyright 1997.*

* cited by examiner

*Primary Examiner*—Glenn A Auve
*Assistant Examiner*—Trisha Vu
(74) *Attorney, Agent, or Firm*—George Chen

(57) ABSTRACT

Embodiments are generally directed to a method and apparatus for determining compatibility between devices. In one embodiment, a table including a module's parameters and rules associated therewith is obtained from a module. The rules are applied to a slot's parameters to determine the module's compatibility with the slot upon coupling to the slot.

20 Claims, 6 Drawing Sheets

500

| Rule # | Rule |
|---|---|
| 1 | Match |
| 2 | Corresponds to but not the same as |
| 3 | Find on a List |
| 4 | At least one parameter from a list |
| 5 | Dependent Matches |
| 6 | Implied |
| 7 | Conflict of one or more applied rules |

| Parameter | Sequence | Rule |
|---|---|---|
| PCI-Express | 1 | Match |
| Down-Stream | 2 | Corresponds to but not the same as |
| Compatible with Module(X) or Slot(Y) | 3 | Find on a List |
| PCI-Express or AS | 4 | At least one parameter from a list |
| Upstream and Downstream | 5 | Dependent Matches |
| Support for Lane Width of 4 | 6 | Implied |
| N/A | 7 | Conflict of one or more applied rules |

*Fig. 5b*

METHOD AND APPARATUS FOR DETERMINING COMPATIBILITY BETWEEN DEVICES

TECHNICAL FIELD

Embodiments of the invention generally relate to the field of electronic systems, and more particularly, to a method and apparatus for determining compatibility between devices.

BACKGROUND

Management software and/or applications for a system that includes one or more interchangeable devices (hereinafter referred to as a "modular system") often determine interoperability/compatibility of each device to be coupled to the modular system. Modular systems may include, but are not limited to, modular server systems, carrier cards, or interconnect boards. Interchangeable devices (hereinafter referred to as "devices") may include, but are not limited to, blades, carrier cards, interconnects, modules, slots or connectors.

Management software may apply one or more fixed rules to one or more device parameters to determine compatibility between devices. If found compatible, the devices are enabled to operate within the modular system. This may include enabling communication and power links between the devices.

Since modular systems are designed to interchangeably couple many different devices, using fixed rules to determine compatibility is problematic. Fixed rules may become outdated as new devices become available. Accordingly, using fixed rules to determine compatibility may inhibit the interchangeable characteristics of a modular system.

BRIEF DESCRIPTION OF THE DRAWINGS

The invention is illustrated by way of example, and not by way of limitation, in the figures of the accompanying drawings in which like reference numerals refer to similar elements and in which:

FIG. 5a illustrates rules, according to one embodiment;

FIG. 5b illustrates a table including parameters and associated rules, according to one embodiment.

DETAILED DESCRIPTION

Embodiments of the invention are generally directed to a method and apparatus for determining compatibility between devices. A compatibility manager is introduced herein. The compatibility manager is operable to obtain a table from a module when the module is coupled to a slot. The slot is included on an interconnect and has parameters associated therewith. The obtained table includes the module's parameters and rules associated therewith. The compatibility manager applies the rules to the slot's parameters to determine the module's compatibility with the slot.

Figure 1:
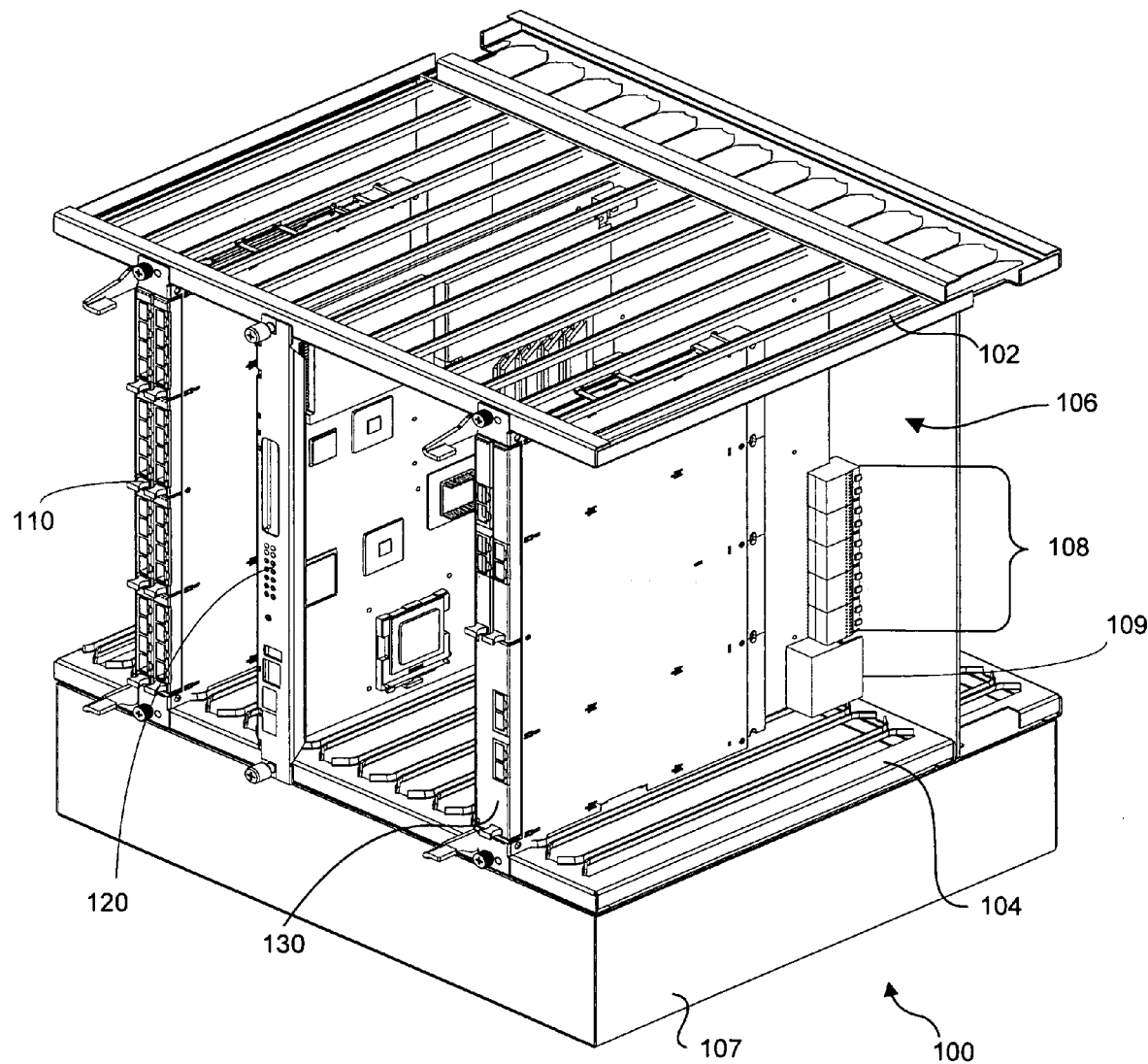
FIG. 1 provides a partial view of a modular platform, according to one embodiment.

FIG. 1 provides a partial view of a modular platform 100, e.g., a server, according to one embodiment. Server 100 may be a telecommunications server designed to be compliant with the PCI Industrial Computer Manufacturers Group (PICMG), Rev. 3.0, Advanced Telecommunications Computing Architecture (ATCA) Base Specification, published Dec. 30, 2002 (hereinafter referred to as "the ATCA 3.0 base specification"). FIG. 1 shows a partial view of server 100 having selected portions removed for clarity.

Server 100 includes three interconnect boards 110, 120 and 130. Each interconnect board contains input/output (I/O) connectors 108 which couple to a backplane 106. I/O connectors 108 may enable devices coupled to a given interconnect board to communicate with server 100 system management devices and/or devices on other interconnect boards. Each interconnect board also contains a power connector 109 which provides power to an interconnect board through power links (not shown in FIG. 1) in backplane 106.

Figure 2:
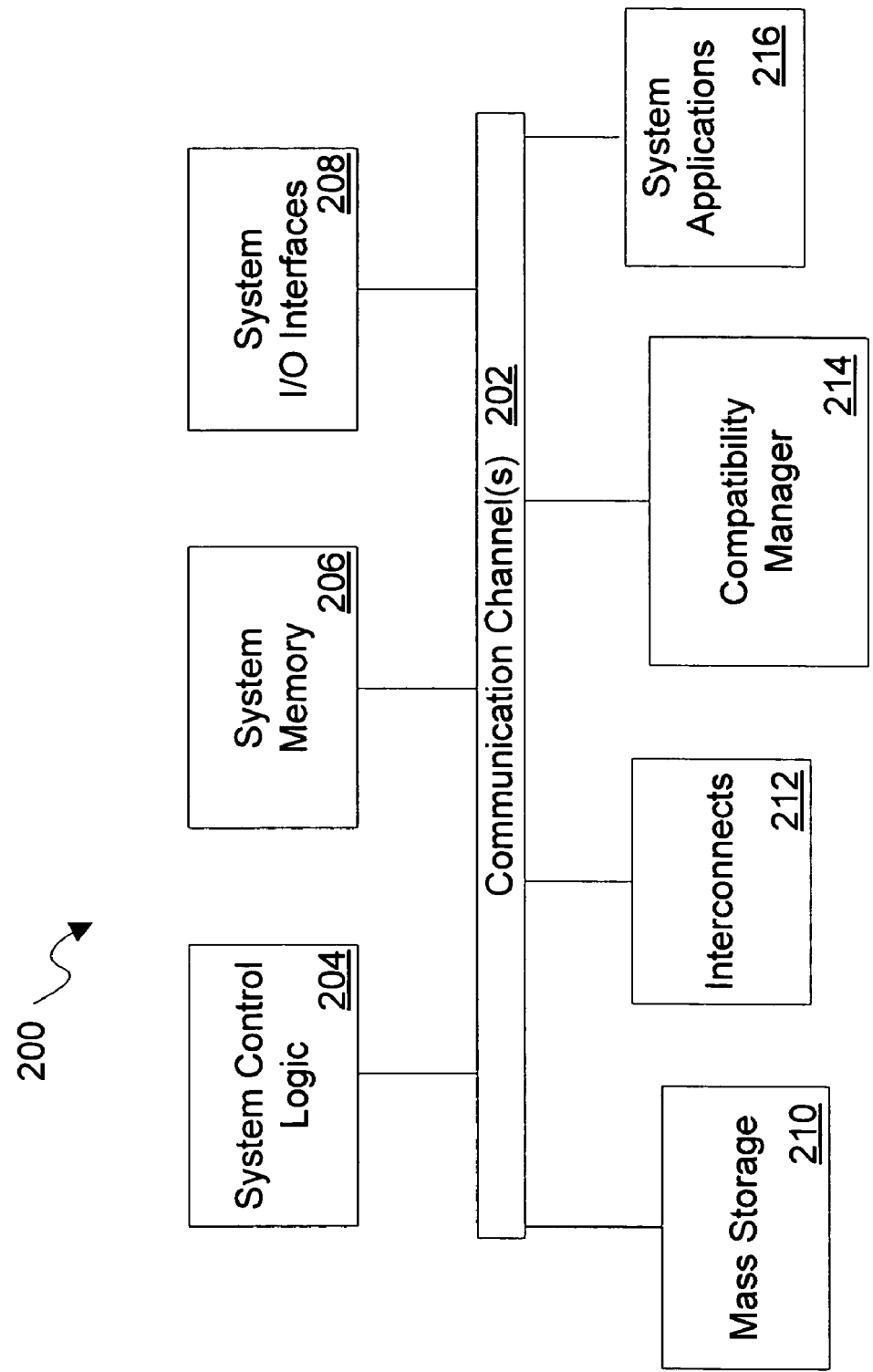
FIG. 2 illustrates an electronic system, according to one embodiment.

FIG. 2 illustrates an electronic system, according to one embodiment. Electronic system 200 represents a block diagram of server 100 with additional elements to perform system level functions. Electronic system 200 includes communication channel(s) 202, system control logic 204, system memory 206, system I/O interfaces 208, mass storage 210, interconnects 212, compatibility manager 214 and system applications 216, each coupled as depicted.

In an example embodiment, interconnects 212 include interconnect boards 110, 120 and 130. In addition, communication channel(s) 202 may include communication links routed through backplane 106. System control logic 204 may invoke an instance of system applications 216 to provide system management functionality to interconnect boards 110, 120 and 130. System management functionality may be provided through communication channel(s) 202 or a combination of communication channel(s) 202 and system I/O interfaces 208. Other elements of electronic system 200 may also communicate in the same manner to interconnect boards 110, 120 and 130.

As described in more detail below, system control logic 204 may also invoke an instance of compatibility manager 214 to determine compatibility for a module-to-module or a module-to-slot coupling.

Figure 3:
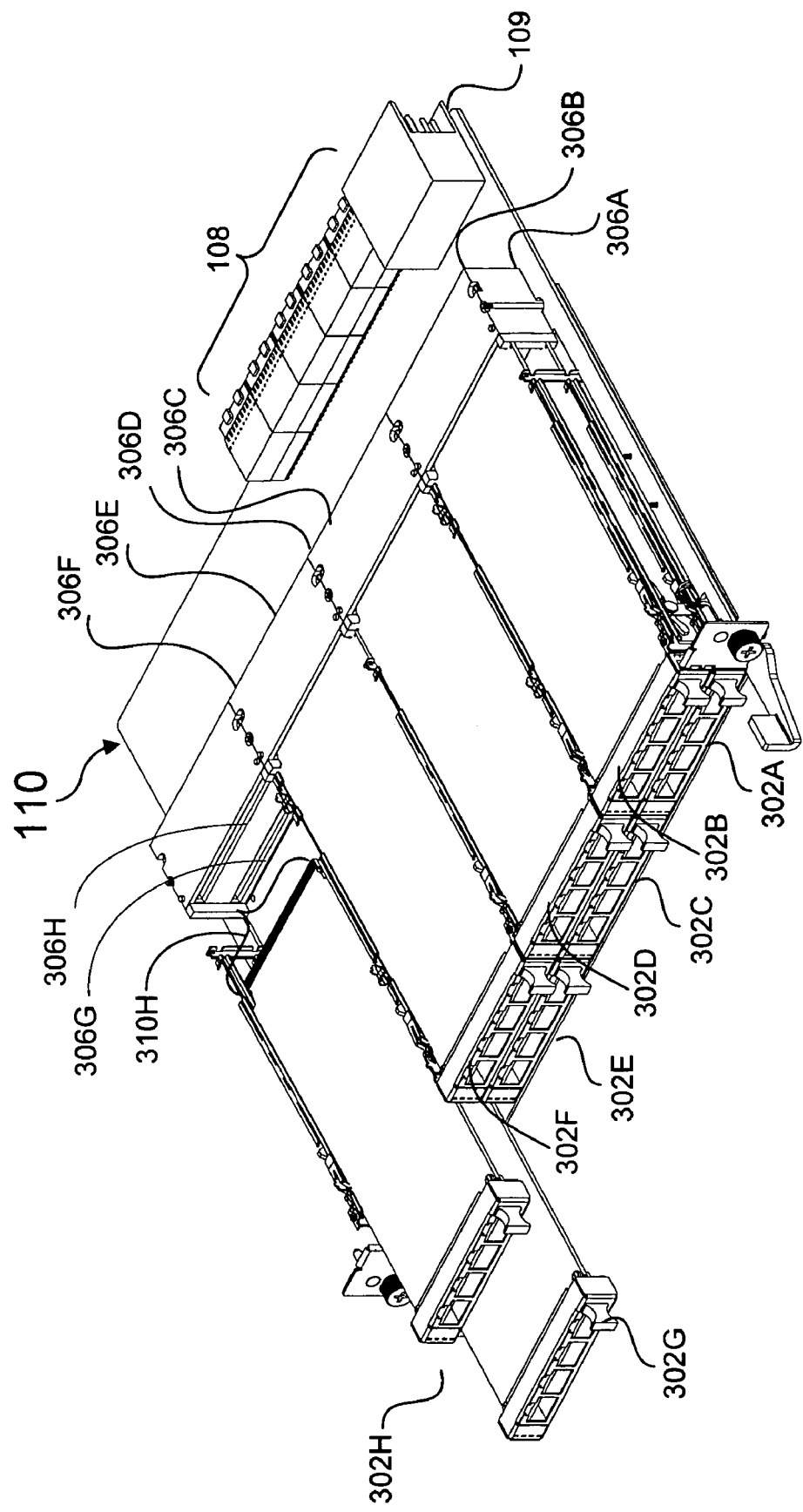
FIG. 3 is an isometric view of an interconnect, according to one embodiment.

FIG. 3 is an isometric view of interconnect board 110, according to one embodiment. Interconnect board 110 includes modules 302 A-H, slots 306 A-H, I/O connectors 108 and power connector 109. In an example embodiment, interconnect board 110 may be a carrier card designed to couple one or more modules (e.g., module 302A-H) to one or more slots (e.g., slot 306A-H).

Module 302H includes a connector 310H. Connector 310H communicatively couples module 302H to slot 306H. Although not shown in FIG. 3, modules 302A-G also contain connectors to communicatively couple each module to its respective slot.

In an example embodiment, connector 310H couples communication links responsive to I/O interfaces/communication ports (not shown in FIG. 1) on module 302H and slot 306H. Connector 310H may also include links to couple power to module 302H. The power, for example, may be routed through slot 306H and power connector 109 to power links in backplane 106. Before enabling communication or power links, interoperability or compatibility between module 302H and slot 306H is determined (e.g., by compatibility manager 214). This compatibility determination is explained in more detail below.

In an example embodiment, compatibility is determined by applying one or more rules associated with module or slot parameters to determine compatibility upon coupling. Module and slot parameters may include such parameters as a number of differential signal pairs supported (hereinafter referred to as "lanes"), pin configuration, power requirements, thermal/cooling requirements, or other mechanical or electrical requirements, and the like. Module and slot parameters may also include an interconnect communication protocol(s) supported. A supported interconnect communication protocol may include, but is not limit to, Ethernet, PCI-Express, Advanced Switching, Fibre Channel, InfiniBand, StarFabic, RapidI/O, and the like.

When a module's or a slot's parameter indicate support for a communication protocol, additional parameters may be specific to and/or implied for that particular communication protocol. For example, a module that is designed to operate in compliance with the PCI-Express Base Specification, Rev. 1.0a, published Apr. 15, 2003 (hereinafter referred to as "the PCI-Express Specification") requires a hierarchical communication flow between devices coupled via point-to-point communication links. Devices may include, for example, modules 302A-H and slots 306A-H. Accordingly, for a compatible coupling, the communication ports associated with each device may need to meet these hierarchical requirements.

In an example embodiment, slots 306A-H may also be referred to as "carrier bays" and modules 302A-H may also be referred to as "mezzanine cards." A mezzanine card may be, for example, a module that provides additional functionality to a carrier board when coupled to a carrier bay, although the invention is not limited in this regard. For example, a mezzanine card may contain mass storage, graphics processors, I/O processors, etc.

As mentioned previously, interconnect board 110 may be a carrier card. Interconnect board 110 may also operate in compliance with a proposed PIGMG specification. This proposed PIGMG specification provides guidelines for the design and operation of carrier cards and mezzanine cards. The proposed PICMG specification is known as the Advanced Mezzanine Card (AMC) Specification (hereinafter referred to as "PICMG AMC.0"). PICMG AMC.0 describes a process called E-keying. As part of the PICMG AMC.0 E-keying process, a module's or slot's parameters and rules associated therewith are presented by the module or slot when coupling to the carrier card (e.g., interconnect board 110). These parameters and associated rules, for example, may be included in a table stored on a storage medium accessible to the module or slot (not shown in FIG. 3). The table may be made accessible or transmitted by a module or slot to system resources (e.g., compatibility manager 214) after or upon coupling to the carrier card. Making accessible or transmitting the table may be referred to as "presenting" the table and system resources receiving or accessing the table may be referred to as "obtaining" the table, although the invention is not limited in this regard.

System resources may then apply the rules in the table. As explained in more detail below, the applied rules determine whether each module-to-slot and/or module-to-module coupling is compatible. Based, at least in part, on this determination, system resources may enable and/or configure communication and/or power links (e.g., routed through connector 310H).

According to an embodiment, modules 302 A-H and slots 306 A-H are designed to be compliant with the above mentioned E-keying process. For example, module 302H is to be communicatively coupled to slot 306H via connector 310H. Module 302H includes a memory (not shown in FIG. 3). The memory includes a table. The table includes module 302H's parameters and rules associated therewith. Upon coupling to slot 306H, module 302H may present this table (e.g., through connector 310H) to system resources associated with interconnect board 110.

Once module 302H presents the table, system control logic 204 invokes an instance of compatibility manager 214. Compatibility manager 214 then obtains the table and makes decisions based in part on the information contained in the table.

If compatibility manager 214 determines that module 302H and slot 306H are compatible, then system control logic 204 may enable communication and power links through connector 310H or invoke an instance of system applications 216 to generate a compatibility indication (e.g., a flag). The compatibility indication may then be temporarily stored in a memory (e.g., system memory 206), although the invention is not limited in this regard.

Figure 4:
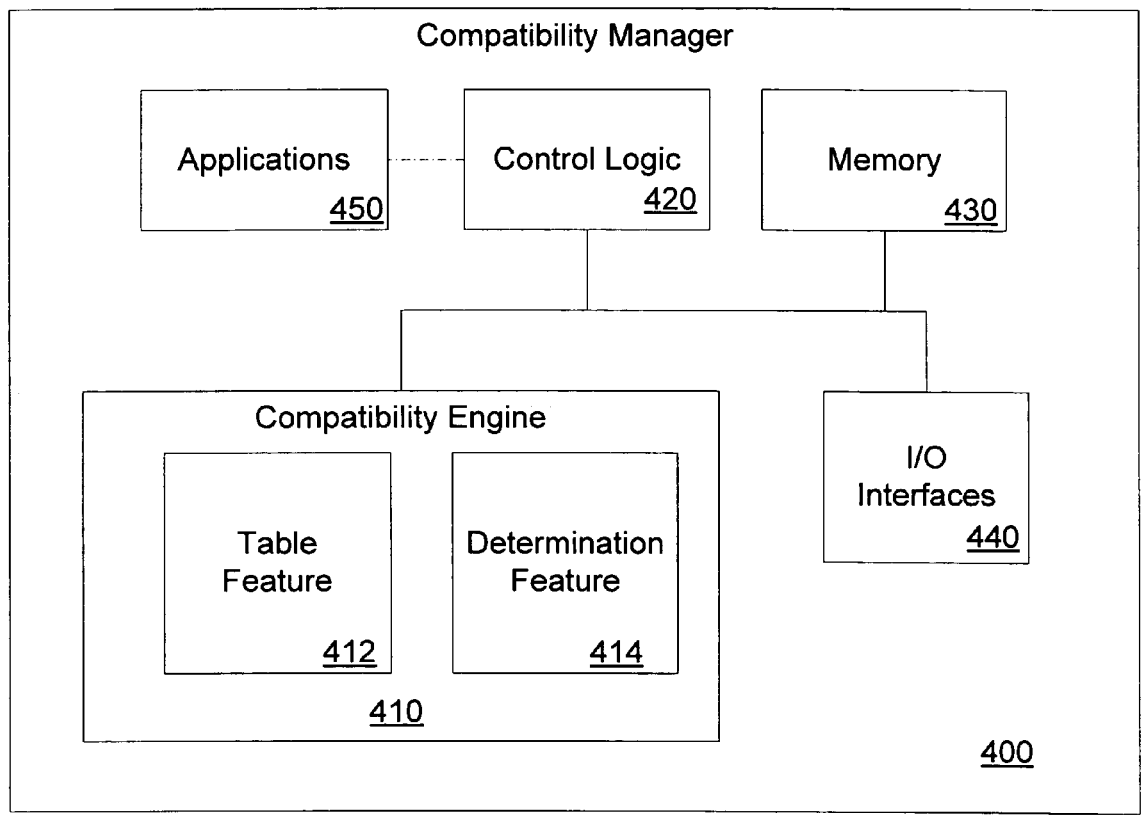
FIG. 4 is an architectural diagram of a compatibility manager, according to one embodiment.

FIG. 4 is an architectural diagram of a compatibility manager, according to one embodiment. Compatibility manager 400 includes a compatibility engine 410, control logic 420, memory 430, I/O interface 440, and optionally one or more applications 450, each coupled as depicted.

Compatibility engine 410 includes a table feature 412, and determination feature 414. Table feature 412 obtains a table presented from a module or slot. The table includes the module's or slot's parameters and rules associated therewith. Determination feature 414 then applies the rules to determine compatibility of a module or a slot upon coupling to another module or another slot.

Control logic 420 controls the overall operation of compatibility manager 400 and is intended to represent any of a wide variety of logic device(s) and/or executable content to implement the operation of compatibility manager 400. Control logic 420 may well comprise a microprocessor, network processor, microcontroller, field programmable gate array (FPGA), application specific integrated circuit (ASIC), or executable content to implement such control features, and/or any combination thereof. In alternate embodiments, the features and functionality of control logic 420 may well be implemented within compatibility engine 410.

In an example embodiment, control logic 420 invokes an instance of compatibility engine 410 to determine compatibility of a module or a slot upon coupling to another module or another slot.

As used herein, memory 430 is intended to represent a wide variety of memory media including, but not limited to volatile memory, non-volatile memory, flash and programmatic variables or states.

According to an example embodiment, memory 430 is used to temporarily store a table obtained from a module or slot. The table includes the module's or slot's parameters and rules associated therewith. Memory 430 may also temporarily store one or more parameters associated with other modules or other slots as well as other system parameters used to determine compatibility.

I/O interfaces 440 provide a communication interface between compatibility manager 400 and an electronic system. For example, compatibility manager 400 may be implemented as an element of a communication network (e.g., electronic system 200), wherein I/O interfaces 440 provide a communication interface between compatibility manager 400 and the communication network via a communication channel (e.g., communication channel(s) 202). Control logic 420 can receive a series of instructions from application software external to compatibility manager 400 via I/O interfaces 440. The series of instructions may invoke control logic 420 to implement one or more features of compatibility engine 410.

In an example embodiment, compatibility manager 400 may include one or more applications 450 to provide instructions to control logic 420. Such applications 450 may well be invoked to generate a user interface, e.g., a graphical user interface (GUI), to enable administration features, and the like. In alternate embodiments, one or more features of compatibility engine 410 may well be implemented as applications 450, invoked by control logic 420 to invoke such features.

In an example embodiment, upon coupling to slot 306H, module 302H presents a table (e.g., through connector 310H). The table includes module 302H's parameters and rules associated therewith. Once compatibility manager 400 obtains the table, compatibility manager 400 then invokes an instance of table feature 412 to temporarily store the table (e.g., in memory 430).

After table feature 412 has stored the table obtained from module 302H, compatibility engine 410 invokes an instance of determination feature 414. Determination feature 414 accesses the table specific to module 302H (e.g., from memory 430). Determination feature 414 will also obtain one or more parameters specific to slot 306H (e.g., stored in memory 430). Determination feature 414 then applies the rules associated with module 302H's parameters to slot 306H's parameters. The rules are applied to determine the compatibility of module 302H when coupled to slot 306H.

In an example embodiment, the parameters of slot 306H may be implied to include parameters of one or more other modules coupled to interconnect board 110. These parameters may indicate that one or more of slot 306H's parameters also include parameters obtained from one or more other modules. For example, these implied parameters may indicate the type of connection (e.g., a PCI-Express connection) between slot 306H and another module or modules. For purposes of subsequent discussion, the implied parameters of the one or more other modules are considered to be part of slot 306H's parameters.

In an example embodiment, each rule associated with module 302H's parameters are applied by determination feature 414 to each applicable slot 306H parameter in a sequential order. An "applied rule" may result in none, one, or multiple compatible configurations. Thus, each sequentially ordered rule may be expressed in Boolean terms to resolve conflicts between two or more applied rules. If one or more rules conflict, determination feature 414 may use the Boolean terms to resolve the rules conflict. For example, one applied rule indicates incompatibility between module 302H and slot 306H and yet another applied rule indicates compatibility. Boolean terms to resolve the conflict may reflect a higher preference for compatibility determined by one rule over another rule or groups of rules over one or more other rules.

In another example embodiment, if a rules conflict results, determination feature 414 forwards the rules conflict to applications 450 to either resolve the conflict or allow an operator to resolve the conflict.

In another example embodiment, the rules associated with module 302H's parameters may be arranged in the table in a sequential order or applied by determination feature 414 in a particular sequential order. The arranged or applied sequential order, for example, may be based on a higher preference for rules applied first in the sequence. Conflicts may be avoided by determining compatibility based on a rule or a grouping of rules satisfied first in the sequence.

FIG. 5a illustrates rules, according to one embodiment. Table 500 comprises example rules numbered 1-7. In an example embodiment, each of the first six rules in table 500 may be associated with one or more module or slot parameters. A seventh rule in table 500 is not associated with one particular parameter but is applied if two or more rules conflict.

In the following rules, all examples are from the perspective of compatibility for a module coupling to a slot. This is to simplify the description of each rule and the invention is not limited to this perspective.

Rule #1 states that a slot's parameter matches a given parameter. As a result, when rule #1 is applied to the slot's parameters, compatibility is based, at least in part, on whether the slot's parameters include a parameter that matches the given parameter.

Rule #2 states that a slot's parameter corresponds to, but is not the same as, a given parameter. The given parameter may be, for example, an indication that the module will support a downstream PCI-Express communication port. A parameter that corresponds to, but is not the same as, this given parameter is a parameter indicating support for an upstream PCI-Express communication port. Accordingly, in this example, when rule #2 is applied to the slot's parameters, compatibility is based, at least in part, on whether the slot's parameters include a parameter indicating the slot supports an upstream PCI-Express communication port.

Rule #3 states that a slot is to be found on a given list of slots. As a result, when rule #3 is applied, compatibility is based, at least in part, on whether the slot is found on the given list of slots.

Rule #4 states that a slot's parameters include at least one parameter from a list of given parameters. As a result, when rule #4 is applied, compatibility is based, at least in part, on whether the slot's parameters include at least one parameter on the list of given parameters.

In an example embodiment, a list of given parameters may be included in the table presented by module 302H upon coupling to slot 306H.

In another example embodiment, the list of given parameters may be implied from a given module parameter associated with the rule.

In another embodiment, the list of given parameters may be derived from one or more other slot or module parameters.

Rule #5 states that a slot's parameters include a corresponding parameter for a first function and include both the corresponding parameter and another corresponding parameter for a second function. As a result, when rule #5 is applied, compatibility for the first function is based, at least in part, on whether the slot's parameters include the corresponding parameter. In addition, compatibility for the second function is based, at least in part, on whether the slot's parameters include both the corresponding parameter and the other corresponding parameter.

Rule #6 states that a slot's parameters include at least one parameter that is implied from a given parameter and that the at least one implied parameter corresponds to another given parameter. For example, the given parameter may be an indication of a slot's support for a lane width of 4. The slot's support of a lane width of 4 may then imply a parameter that indicates the slot supports lane widths of 4 or less. The slot's support of a lane width of 4 or less may then correspond to a minimum lane width of 3. This corresponding minimum lane width of 3, for example, may be based on what bandwidth the module needs to function as designed. As a result, when rule #6 is applied to the example above, compatibility is based, at least in part, on whether the slot's parameters include an indication of support for lane widths that imply support for bandwidths that correspond to a minimum lane width of 3.

Rule #7 states that an applied rule cannot conflict with or contradict another applied rule. As a result, when rule #7 is applied, compatibility is based, at least in part, on whether one or more applied rules conflict with one or more other applied rules.

FIG. 5b illustrates a table including parameters and associated rules, according to one embodiment. Table 550 includes six parameters and seven rules associated therewith.

In an example embodiment, table 550 is presented by a module or slot. The rules associated with each parameter listed in table 550 are then applied to another module's or slot's parameters to determine compatibility upon coupling.

The parameters and associated rules shown in table 550 are numbered 1-7 to facilitate a description of how they are applied to determine compatibility. As mentioned above, the rules may or may not be applied in a sequential order and thus application of the rules is not limited to the sequential order shown in table 550.

In an embodiment, table 550 shows the contents of a table obtained from module 302H upon coupling to slot 306H. As introduced above, compatibility manager 400 may temporarily store the table in memory (e.g., memory 430). In this embodiment, module 302H includes the following six parameters in table 550: (1) designed to operate in compliance with the PCI-Express Specification; (2) a PCI-Express communication port on connector 310H is configured as a downstream communication port; (3) compatible with modules made from manufacturer "x" and compatible with slots made from manufacturer "y"; (4) is designed to operate in compliance with either the PCI-Express Specification or can also operate in compliance with the Advanced Switching Core Architecture Specification, Rev. 1.0, published December 2003, hereinafter referred to as "the AS Core Specification"; (5) a PCI-Express communication port on connector 310H can be configured to support both downstream and upstream communications; and (6) can support a lane width of 4 on connector 310H.

As mentioned previously, the PCI-Express Specification requires a hierarchical communication flow between devices. The flow of communication moves "upstream" towards a root complex or "downstream" away from the root complex. A root complex is described in the PCI-Express Specification as the root of an I/O hierarchy that connects the central processing unit (CPU)/memory subsystem to the I/O communication channel(s) of a device.

For parameter #2 above, module 302H indicates that a PCI-Express communication port on connector 310H is configured as a "downstream" communication port. Since the PCI-Express communication port is configured as a "downstream" communication port, module 302H is not configured as a root device. The root device may be located, for example, either on interconnect board 110 (e.g., on another module), on another interconnect board of server 100. Therefore, based on the hierarchical requirements of the PCI-Express Specification, to be compatible, the "downstream" configured communication port on connector 310H needs to connect to an "upstream" configured communication port of another slot or module when coupled.

In an example embodiment, module 302H associates rules with the above listed parameters to generate a table that includes the contents shown in table 550. This table may be stored on a storage medium accessible to module 302H. The table may then be presented to system resources (e.g., compatibility manager 214).

Once module 302H couples to slot 306H, the table is presented by module 302H, for example, through connector 310H. Compatibility manager 400 may then obtain the table and apply the rules in the table to slot 306H's parameters to determine whether module 302H is compatible with slot 306H. Based on the results of the determination, compatibility manager 400 may flag the module 302H to slot 306H coupling as compatible or not compatible. Compatibility manager 400 may further store indications of a required or a preferred configuration of the module and/or slot necessary to achieve full or operational compatibility. The flag and other indications may then be stored (e.g., in memory 430 or memory 206) and/or relayed to system applications 216 via communication channel(s) 202. The flag may be used to indicate whether to enable communication and/or power links between module 302H and slot 306H. System applications 216 may also use the other indications to determine what configuration parameters may be associated with the enabling flag.

Figure 6:
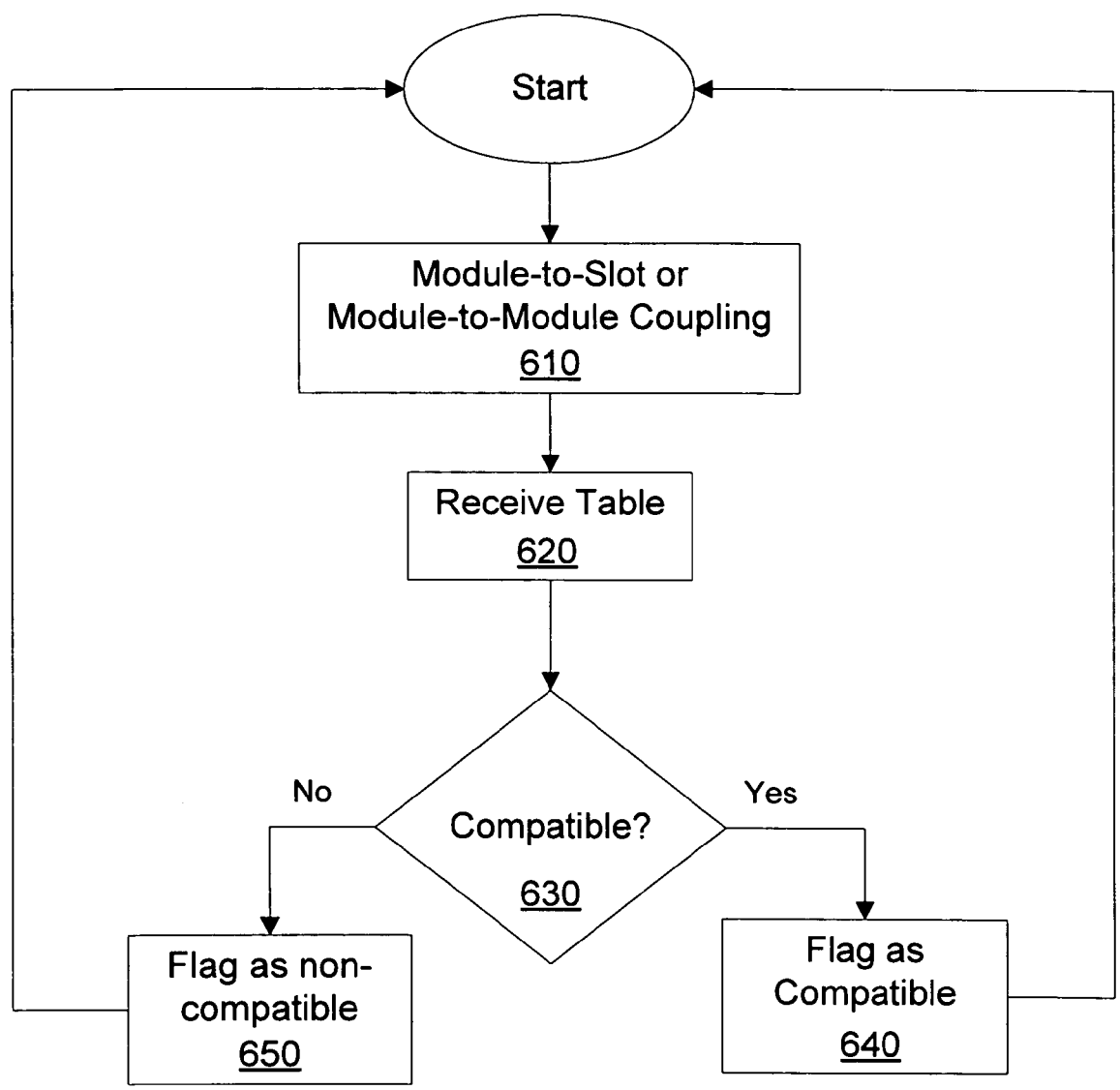
FIG. 6 is a flow chart of an example method to determine compatibility, according to one embodiment.

FIG. 6 is a flow chart of an example method to determine compatibility, according to one embodiment. The process begins in block 610, where according to an example embodiment, module 302H (as shown in FIG. 3) is to be coupled to slot 306H via connector 310H.

Upon coupling, module 302H presents a table (e.g., through connector 310H) to compatibility manager 400. The table includes the module's parameters and associated rules as shown in table 550. The process then moves to block 620.

Once the table is presented, compatibility engine 410 invokes an instance of table feature 412 to obtain and temporarily store the table (e.g., in memory 430). The process then moves to block 630.

In block 630, compatibility engine 410 invokes an instance of determination feature 414. Determination feature 414 first obtains one or more parameters of slot 306H. In an example implementation, one or more parameters for slot 306H may have been previously obtained from slot 306H when slot 306H was first enabled or coupled to interconnect board 110. Determination feature 414 then accesses module 302H's table that was temporarily stored by table feature 412. Determination feature 414 applies the rules in module 302H's table to the one or more parameters of slot 306H. Compatibility is then determined based, at least in part, on the applied rules.

If determination feature 414 determines that module 302H and slot 306H are compatible, the process moves to block 640. In block 640, determination feature 414 flags the coupling of module 302H and slot 306H as a compatible coupling on interconnect board 110. The flag and possibly other configuration parameters are then stored in a memory (e.g., memory 430) and/or relayed to system resources (e.g., system control logic 204.) The process may then start over if an indication is received by compatibility manager 400 that a change in parameters for either module 302H or slot 306H requires a new compatibility determination, although the invention is not limited in this regard.

If determination feature 414 determines that module 302H and slot 306H are not compatible, the process moves to block 650. In block 650, determination feature 414 flags the coupling of module 302H and slot 306H as a non-compatible coupling on interconnect board 110. The flag is then stored in a memory (e.g., memory 430) and/or relayed to system resources (e.g., system control logic 204). The process may then start over if an indication is received by compatibility manager 400 that a change in parameters for either module 302H or slot 306H requires a new compatibility determination, although the invention is not limited in this regard.

In an example embodiment, configuration manager 214 may determine compatibility for blade-to-slot and blade-to-blade couplings in the same manner as described above for module-to-slot and module-to-module compatibility determinations. For example, interconnect board 110 is to be coupled to a slot on backplane 106 through I/O connectors 108. Upon coupling, interconnect board 110 may present a table including interconnect board 110's parameters and rules associated therewith. Compatibility manager 214 may then obtain the table and apply the rules to the slot's parameters to determine interconnect board 110's compatibility with the slot.

In FIG. 2, electronic system 200 may be a computer, media server, storage server, telecommunications server, switch or router for a communication network, although the invention is not limited to these embodiments.

In accordance with one embodiment, system control logic 204 controls the overall operation of electronic system 200 and is intended to represent any of a wide variety of logic device(s) and/or executable content to implement the operation of electronic system 200, described herein. In this regard, system control logic 204 may well comprise a compute blade, microprocessor, network processor, microcontroller, FPGA, ASIC, executable content to implement such control features and/or any combination thereof. The functionality of system control logic 204 may be distributed and/or hierarchical across a plurality of such device(s) and/or executable content.

Electronic system 200 further includes system memory 206 to store information/features offered by electronic system 200. System memory 206 may be used to store temporary variables or other intermediate information during execution of instructions by system control logic 204. System memory 206 may well include a wide variety of memory media including but not limited to volatile memory, non-volatile memory, flash, programmable variables or states, random access memory (RAM), read-only memory (ROM), flash, or other static or dynamic storage media.

In accordance with one example embodiment, machine-readable instructions can be provided to system memory 206 from a form of machine-accessible medium. As used herein, a machine-accessible medium is intended to represent any mechanism that provides (i.e., stores and/or transmits) information in a form readable by a machine (e.g., electronic system 200). For example, a machine-accessible medium may well include a computer readable medium that includes: ROM; RAM magnetic disk storage media; optical storage media; flash memory devices and the like. The machine accessible medium may also include a communication medium that includes: electrical, optical, acoustical or other form of propagated signals (e.g., carrier waves, infrared signals, digital signals); and the like. Instructions may also be provided to system memory 206 via a remote connection through system I/O interfaces 208 (e.g., over a communication network).

System I/O interfaces 208 may enable one or more element(s), e.g., system control logic 204, to interact with input and/or output devices, for example, a mouse, keyboard, touchpad, cathode ray tube monitor, liquid crystal display, etc.

As mentioned above, interconnects 212 represent elements of electronic system 200 that may include interconnect boards (e.g., interconnect boards 110, 120 and 130). In addition, interconnects 212 may well further include one or more of a compute blade, media blade, a switch blade, storage blade, and the like, although the invention is not limited to only these types of blades.

As mentioned above, compatibility manager 214 may be encompassed within an interconnect board (e.g., interconnect board 110) of interconnects 212. Alternatively, compatibility manager 214 may well be communicatively coupled to an interconnect board and/or other interconnects of interconnects 212 through e.g., communication channel(s) 202. The functionality of compatibility manager 214 may be provided via communication channel(s) 202 to interconnects 212. The functionality of compatibility manager 214 may be hierarchical (e.g., at the interconnect and/or modular platform level) or may be distributed (e.g. across multiple interconnects).

According to one example embodiment, compatibility manager 214's determination of compatibility of a module-to-slot or a module-to-module coupling may well be implemented in hardware, software, firmware, or any combination thereof. For example, compatibility manager 214 may well be implemented as one or more of an ASIC, special function controller or processor, FPGA, other hardware device, and firmware or software to perform at least the functions described herein.

In the previous descriptions, for the purpose of explanation, numerous specific details were set forth in order to provide a thorough understanding of the invention. It will be apparent, however, to one skilled in the art, that the invention can be practiced without these specific details. In other instances, structures and devices were shown in block diagram form in order to avoid obscuring the invention.

References made in the specification to the term "responsive to" are not limited to responsiveness to only a particular feature and/or structure. A feature may also be "responsive to" another feature and/or structure and also be located within or included with hat feature and/or structure. Additionally, the term "responsive to" may also be synonymous with other terms such as "communicatively coupled to" or "operatively coupled to", although the term is not limited in this regard.

References made in the specification to "one embodiment" or "an embodiment" means that a particular feature, structure or characteristic described in connection with that embodiment is included in at least one embodiment of the invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily referring to the same embodiment.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative of, rather than limiting the scope and coverage of the claims appended hereto.

What is claimed is:

1. A method comprising:
   coupling a module to a slot in an interconnect board of a system;
   invoking a system control logic;
   receiving a series of instructions from the system;
   accessing a module memory;
   obtaining a table stored in the module memory;
   transmitting the table to the system;
   storing the table in system memory;
   accessing parameters and rules for the module in the table;
   applying the rules associated with the parameters to determine the module's compatibility with the slot
   invoking a user interface as needed to allow an operator to resolve any conflict of rules between the module and the slot;
   generating a compatibility indicator;
   storing the compatibility indicator in the system memory;
   configuring the module and the slot to achieve compatibility;

enabling communication between the module and the system; and starting the process over if an indication is received that the parameters for the module or the slot have changed.

2. A method according to claim 1, further comprising:

arranging the rules in a sequential order, wherein the rules are applied in the sequential order.

3. A method according to claim 2, wherein the sequentially applied rules are expressed in Boolean terms and the Boolean terms are used to resolve a rules conflict.

4. A method according to claim 2, wherein a first rule satisfied determines compatibility.

5. A method according to claim 4, wherein the rules are sequentially arranged based, at least in part, on a preference to apply a given rule first in the sequence.

6. A method according to claim 1, wherein the rules comprise a rule that the slot's parameters include a parameter that matches a given module parameter.

7. A method according to claim 6, wherein the given module parameter indicates the module is designed to operate in compliance with the PCI-Express Specification.

8. A method according to claim 1, wherein the rules comprise a rule that the slot's parameters include a parameter that corresponds to, but is not the same as, a given module parameter.

9. A method according to claim 8, wherein the corresponding parameter indicates the slot supports an upstream PCI-Express communication port.

10. A method according to claim 9, wherein the given parameter included in the table comprises the given parameter indicating the module supports a downstream PCI-Express communication port.

11. A method according to claim 1, wherein the rules comprise a rule that the slot be found on a list of slots included in the module's parameters.

12. A method according to claim 1, wherein the rules comprise a rule that the slot's parameters include at least one parameter from a list of given module parameters.

13. A method according to claim 12, wherein the list of given module parameters comprises a list included in the table.

14. A method according to claim 12, wherein the list of given module parameters comprise a list implied from a given parameter.

15. A method according to claim 12, wherein the list of given module parameters comprise a list derived from one or more other slot or module parameters.

16. A method according to claim 12, wherein the list of given module parameters comprise a list of lane widths supported by the module.

17. A method according to claim 1, further comprising:

the rules including a rule that the slot's parameters include a corresponding parameter for a first function, the corresponding parameter to include indicating support for a PCI-Express communication port, wherein if the slot's parameters includes indicating support for a PCI-Express communication port, the module is compatible with the slot upon coupling for the first function; and compatibility for a second function is based on whether the module is determined to be compatible with the slot upon coupling for the first function, and on whether the slot's parameters include another corresponding parameter for the second function, the other corresponding parameter to include indicating support for a communication port to a PCI-Express root complex.

18. A method according to claim 1, wherein the rules comprise a rule that the slot's parameters include at least one parameter that is implied from a given parameter and that the at least one implied parameter corresponds to another given parameter.

19. A method according to claim 18 further comprising:

the given parameter comprises a specific number of lane widths supported by the slot and the at least one parameter implied from the specific number of lane widths supported is an indication of supporting lane widths equal to or less than the specific number;

the other given parameter comprises a module parameter that indicates a minimum number of supported lane widths for compatibility.

20. A method according to claim 1, wherein the rules comprise a rule that if a given applied rule conflicts with another given applied rule, than the module is determined not to be compatible with the slot upon coupling to the slot.

* * * * *